(12) United States Patent
Najafi et al.

(10) Patent No.: US 8,749,361 B2
(45) Date of Patent: Jun. 10, 2014

(54) METHOD AND SYSTEM FOR TACTILE SIGNALED AUTHENTICATION

(75) Inventors: Maryam Najafi, San Jose, CA (US); David Sward, Gilroy, CA (US)

(73) Assignee: Symantec Corporation, Mountain View, CA (US)

( * ) Notice: Subject to any disclaimer, the term of this patent is extended or adjusted under 35 U.S.C. 154(b) by 242 days.

(21) Appl. No.: 13/233,964

(22) Filed: Sep. 15, 2011

(65) Prior Publication Data
US 2013/0069772 A1 Mar. 21, 2013

(51) Int. Cl.
*H04B 3/36* (2006.01)
*G08B 6/00* (2006.01)
*G09B 21/00* (2006.01)
*G06F 3/01* (2006.01)

(52) U.S. Cl.
CPC .............. *G08B 6/00* (2013.01); *G09B 21/003* (2013.01); *G06F 3/016* (2013.01)
USPC .......... 340/407.1; 726/17; 726/20; 340/384.1

(58) Field of Classification Search
CPC ......... G08B 6/00; G06F 3/016; G09B 21/003
USPC ....................................................... 340/407.1
See application file for complete search history.

(56) References Cited

U.S. PATENT DOCUMENTS

| | | | |
|---|---|---|---|
| 2003/0159068 A1* | 8/2003 | Halpin et al. ................. | 713/201 |
| 2007/0133770 A1* | 6/2007 | LaPierre et al. .......... | 379/142.01 |
| 2008/0105751 A1* | 5/2008 | Landau .......................... | 235/492 |
| 2009/0179779 A1* | 7/2009 | Katayama et al. .............. | 341/22 |
| 2011/0277023 A1* | 11/2011 | Meylemans et al. .............. | 726/7 |
| 2012/0276871 A1* | 11/2012 | Tanioka ........................ | 455/411 |

* cited by examiner

*Primary Examiner* — Kerri McNally
(74) *Attorney, Agent, or Firm* — Lowenstein Sandler LLP

(57) ABSTRACT

A system and method of transmitting an authentication code includes automatically calculating a security code on a device executing a security program. The security program may periodically calculate a respective unique security code. In response to a user requesting the security code, the device automatically vibrates according to a pattern representing the security code. The pattern tactilely communicates the security code to the user.

21 Claims, 12 Drawing Sheets

Update Flow Designs

User clicks on "Update Now" button, animate icon

842

After animate icon, display this message if update available

844

No update message

846

User updates via Live Update

850

Progress bar

848

Update successful

852

Update NOT successful

854

METHOD AND SYSTEM FOR TACTILE SIGNALED AUTHENTICATION

FIELD

Embodiments according to the present invention generally relate to computer systems, in particular to online account authentication.

BACKGROUND

Typically, users log into accounts using a user name and password. For example, a user may use a web browser to log into their bank account information. The bank's web page requests the user's name and password, and then grants access to the user's account if the correct information is provided.

Unfortunately, users' names and passwords are compromised every day. Thieves, e.g. hackers, may steal names and passwords directly from a user's computer or from user information stored by corporations, e.g. banks, etc. Sometimes users employ the same user name and password for many or all of their online accounts. In such cases, a thief need only trick an unsuspecting user into establishing an authorized account on a thief's counterfeit web site. When the user creates the account, the thief is given the user's name and password, and the thief now has access to all of the user's online accounts.

One solution to the problem is for users to authenticate their accounts using a physical dongle device, e.g. an authenticator. An authenticator is a second factor credential device that periodically calculates a unique code known also by the website hosting the account information. The user reads the code from the authenticator, and enters the code along with their user name and password.

For example, a user may navigate to their bank's log in web page. The bank requests a user name, password, and authenticator code. The user enters their user name, password, and then copies the authenticator code from the authenticator dongle device onto the computer. The authenticator code is generally only good for one use and for a limited time. After the user uses the code or after some time has expired, the user must wait, e.g. 30 seconds, for the authenticator to generate a new code.

However, use of an authenticator device can be problematic for visually impaired users. Without the ability to visually read the authenticator code from the authenticator, it is impossible for visually impaired users to retrieve and use the authenticator code. Furthermore, users wishing to use an authenticator in a public place are often concerned with "shoulder surfers," e.g. a thief looking over the users shoulder and copying the code. This leads to an inability to log into accounts protected with the user's authenticator.

SUMMARY

Embodiments of the present invention are directed to a method and system for tactile signaled, e.g. vibration, authentication. The vibration authentication system of the embodiments of the present invention automatically periodically generates a unique code applicable for a user. An authentication security program runs on the authenticator. When a user navigates to a web site, for instance, requiring second factor authentication, the user may request an authentication code from the authenticator. In response to the authentication code request from the user, the authenticator may tactilely communicate the authentication code to the user. For example, the authenticator may communicate the authentication code to the user using discrete, encoded vibrations. These vibrations may be felt by the user's hand, for instance.

In one embodiment, a method of transmitting an authentication code includes: automatically calculating a security code on a device executing a security program; in response to a user requesting the security code, the device automatically vibrates according to a vibration pattern representing the security code, wherein the vibration pattern tactilely communicates the security code to the user.

In some embodiments the security program periodically calculates a respective unique security code. In further embodiments, the device does not contemporaneously visually display the security code.

In various embodiments, the security code is selected from the group consisting of a number, a letter, and a symbol. In some embodiments, in response to the user initiating a security code request from a web site, the device receiving the security code request from the web site, wherein the device interprets the communication as the user requesting the security code.

In one embodiment, the method of transmitting an authentication code further includes audibly rendering the pattern representing the security code. In another embodiment, the authentication device is selected from the group consisting of a mobile device, a smart phone, and a dongle device.

In another embodiment, a method of authentication includes: automatically generating a code on a device; and in response to a user request, the device tactilely rendering the code to a user, wherein the code is operable to be used for authenticating the user to a remote system that maintains a user account. The code may be discrete vibrations, the number and duration of which may encode the security code.

In some embodiments a security program periodically computes a respective unique code. In further embodiments, the device does not contemporaneously visually display the code.

In various embodiments, the code is selected from the group consisting of a number, a character, and a symbol. In some embodiments the method of authentication further includes in response to the user initiating a request from a web site, receiving the request from the web site at the device, wherein the device understands the communication as the user request.

In one embodiment, the method of authentication further includes audibly rendering the code. In various embodiments, the device is selected from the group consisting of a mobile device, a smart phone, and a dongle device.

In another embodiment, a system is described including: a processor; a tactile rendering component; memory coupled to the processor, wherein the memory includes instructions that when executed cause the system to perform a method of transmitting an authentication code, the method including: automatically calculating a security code while executing a security program; and in response to a user requesting the security code, the tactile rendering component automatically vibrates creating discrete vibrations in accordance with a vibration pattern representing the security code, wherein the vibration pattern tactilely communicates the security code to the user.

In some system embodiments, the security program periodically calculates respective unique security codes. In further system embodiments, the method includes not visually displaying the security code. In one system embodiment, the security code is selected from the group consisting of a number, a letter, and a symbol.

In various system embodiments, the method further includes in response to the user initiating a security code request from a web site, receiving the security code request from the web site, and interpreting the communication as the user requesting the security code. In one system embodiment, the method further includes, audibly rendering the security code.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
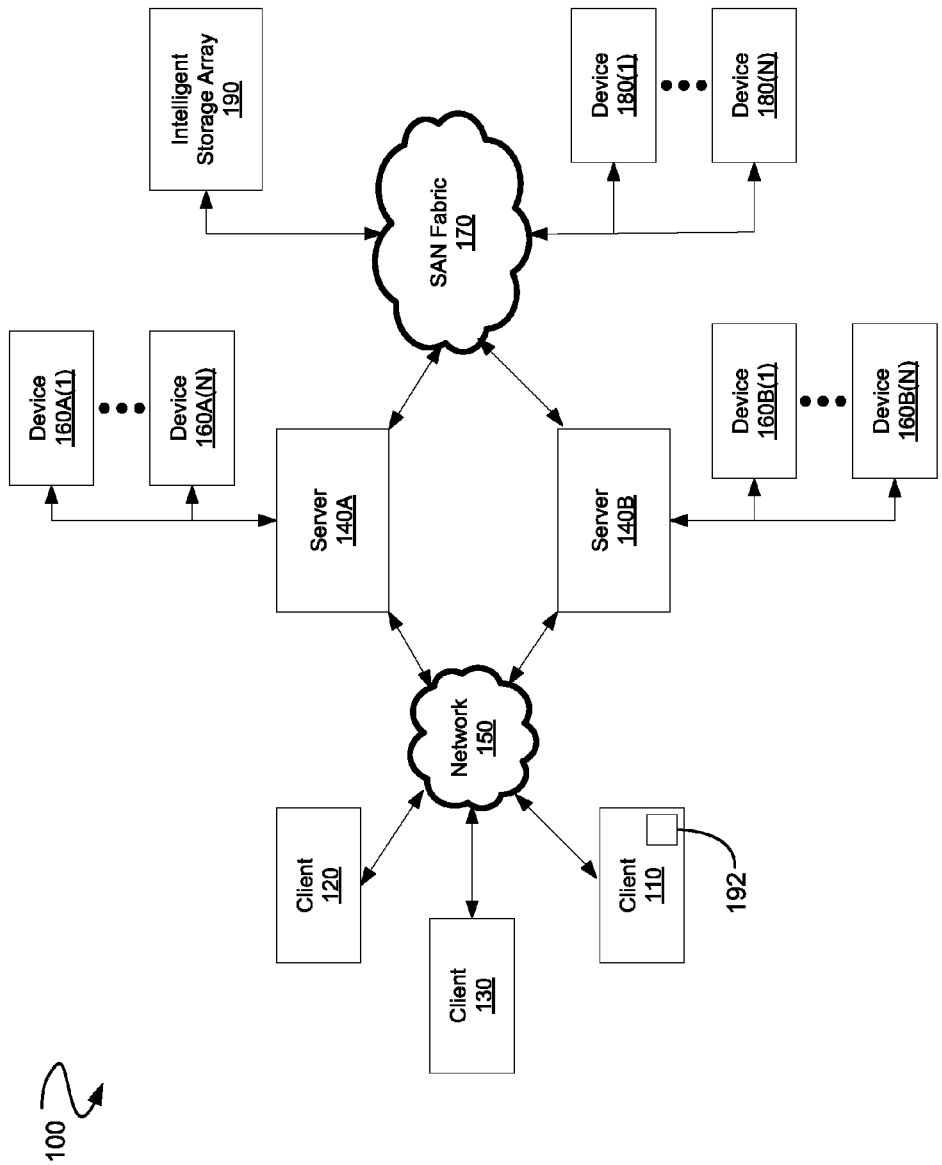
FIG. 1 is a block diagram depicting an exemplary network architecture that can serve as a platform for embodiments of the present invention.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "encoding," "decoding," "receiving," "sending," "using," "applying," "calculating," "incrementing," "comparing," "selecting," "summing," "weighting," "computing," "accessing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

In the discussion that follows, unless otherwise noted, a "connected" refers to communicatively coupling elements via a bus, wireless connection (wifi), Bluetooth, infrared, USB, Ethernet, FireWire, optical, PCI, DVI, etc.

FIG. 1 is an exemplary system in which embodiments of the present invention can be implemented for vibration authentication. FIG. 1 is a block diagram depicting a network architecture 100 in which client systems 110, 120, and 130, as well as storage servers 140A and 140B (any of which can be implemented using computer system 200 (FIG. 2)), are coupled to a network 150. Storage server 140A is further depicted as having storage devices 160A(1)-(N) directly attached, and storage server 140B is depicted with storage devices 160B(1)-(N) directly attached. Servers 140A and 140B may contain a plurality of files that may be shared among a plurality of users. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120, and 130 via network 150. Intelligent storage array 190 is also shown as an example of a specific storage device accessible via SAN fabric 170.

With reference to computer system 200 (FIG. 2), modem 247 (FIG. 2), network interface 248 (FIG. 2), or some other method can be used to provide connectivity from each of client computer systems 110, 120, and 130 to network 150. Client systems 110, 120, and 130 of FIG. 1 are able to access information on storage server 140A or 1408 using, for example, a web browser or other client software (not shown). Such a client allows client systems 110, 120, and 130 to access data hosted by storage server 140A or 1408 or one of storage devices 160A(1)-(N), 160B(1)-(N), 180(1)-(N), or intelligent storage array 190. FIG. 1 depicts the use of a network such as the Internet or exchanging data, but the embodiments of the present invention are not limited to the Internet or any particular network-based environment. In the present embodiments, a method of vibration authentication 192 may be performed in one of the client computer systems 110, 130, and 130. However, the method of vibration authentication 192 is not limited to the client computer systems 110, 130, and 130, and may also operate within, for example, storage server 140A or 140B. In addition, the method of vibration authentication 192 may also operate within cloud computing environments.

Figure 2:
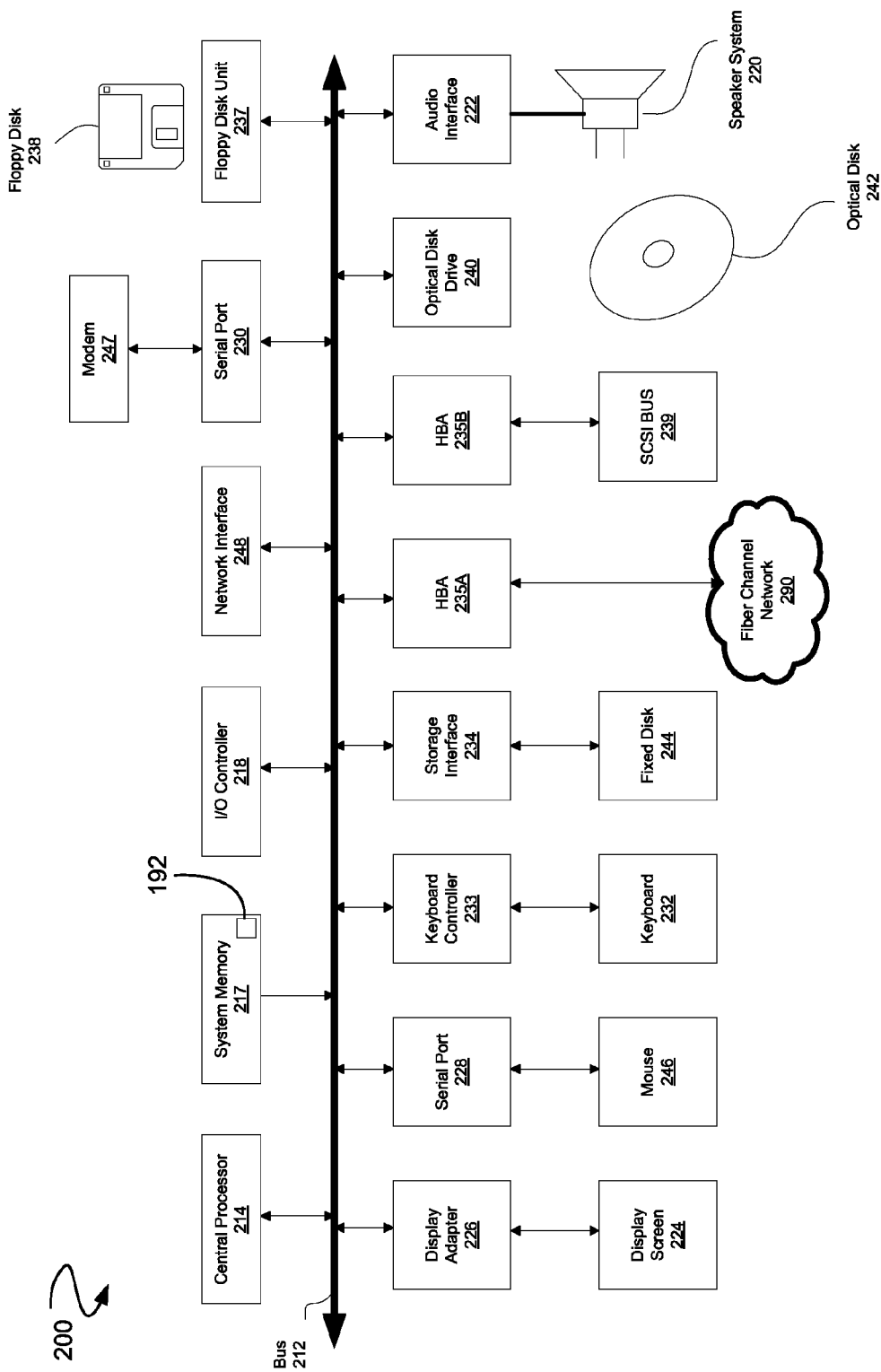
FIG. 2 is a block diagram depicting a computer system suitable for implementing embodiments of the present invention.

FIG. 2 depicts a block diagram of a computer system 200 suitable for implementing embodiments of the present invention. In the discussion to follow, various and numerous components and elements are described. Various combinations and subsets of those components can be used to implement the devices mentioned in conjunction with FIG. 1. For example, client systems 110, 120, and 130 may each be a full-function computer system that employs many, if not all, of the features of the computer system 200. However, the servers 140A and 1408 may utilize only the subset of those features needed to support the functionality provided by those devices. For example, the servers 140A and 140B may not need a keyboard or display, and may execute a relatively sparse operating system that supports the functionality of data storage and data access and the management of such functionality.

Computer system 200 of FIG. 2 includes a bus 212 which interconnects major subsystems of computer system 200, such as a central processor 214, a system memory 217 (typically RAM, but which may also include ROM, flash RAM, or the like), an input/output controller 218, an optional external audio device, such as a speaker system 220 via an audio output interface 222, an optional external device, such as a display screen 224 via display adapter 226, serial ports 228 and 230, an optional keyboard 232 (interfaced with a keyboard controller 233), an optional storage interface 234, an optional floppy disk unit 237 operative to receive a floppy disk 238, an optional host bus adapter (HBA) interface card 235A operative to connect with a Fibre Channel network 290, an optional host bus adapter (NBA) interface card 235B operative to connect to a SCSI bus 239, and an optional optical disk drive 240 operative to receive an optical disk 242. Also, optionally included can be a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 200 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or network interface 248. In the current embodiment, the system memory 217 comprises instructions that when executed cause the system to perform the method of vibration authentication 192.

Storage interface 234, as with the other storage interfaces of computer system 200, can connect to a standard computer readable medium for storage and/or retrieval of information, such as fixed disk drive 244. Fixed disk drive 244 may be part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 200 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Method and System for Vibration Authentication

Figure 3:
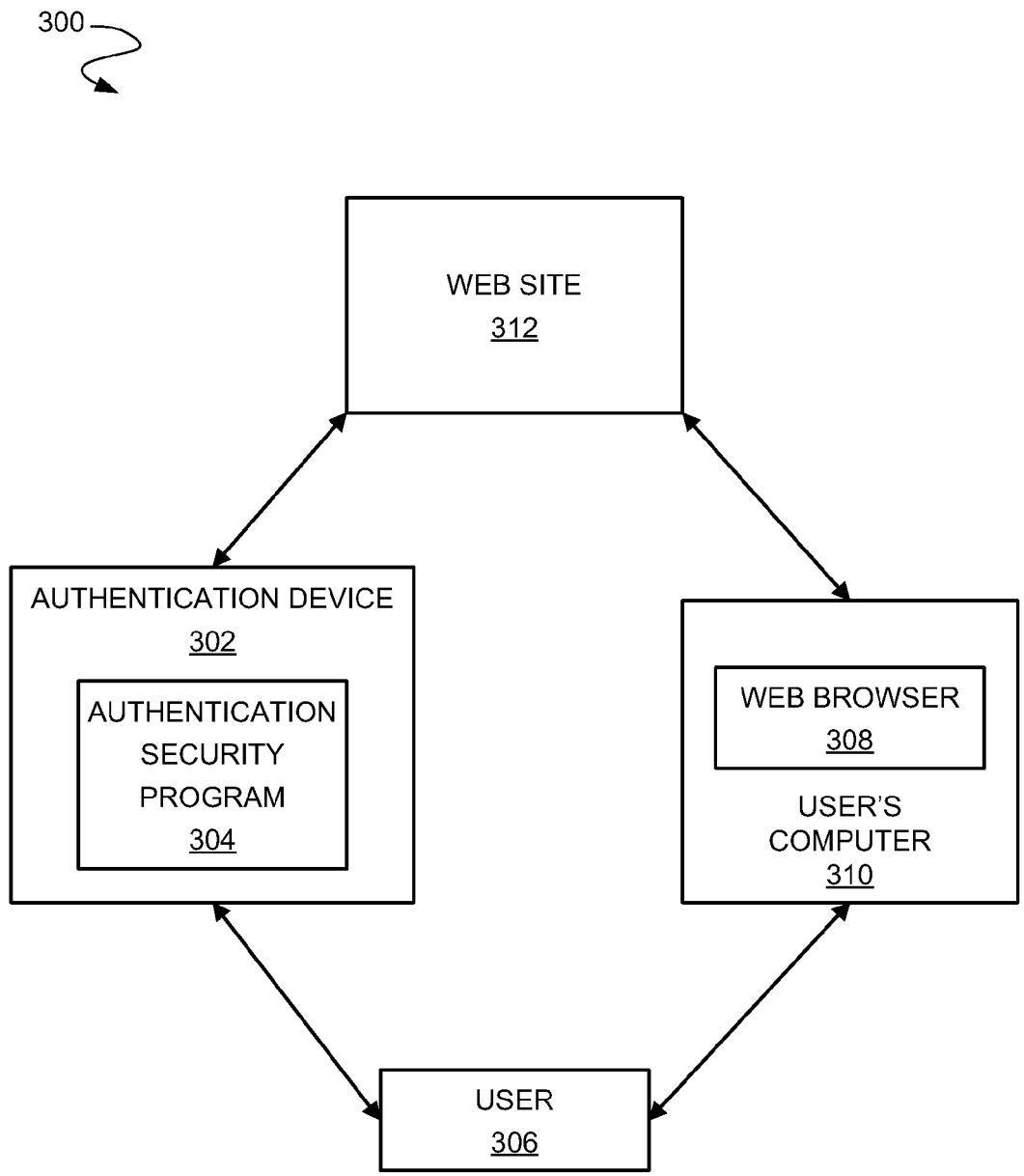
FIG. 3 is a block diagram of an exemplary tactile authentication system, according to an embodiment of the present invention.

FIG. 3 depicts a block diagram of an authentication system 300, according to an exemplary embodiment of the present invention. Embodiments of the present invention enable authentication with the use of a vibrating authentication code generating device, e.g. a physical dongle device, a mobile device, or a mobile application running on a smart phone. The code generating device may render a sequence of discrete vibrations that communicate the security code tactilely.

Some accounts, e.g. web based accounts, require second factor credentials in addition to a user name and password. An authenticator is a second factor credential device that periodically generates a unique code applicable for a user for real-time login to an account of the user. For example, an authenticator may generate a new code, e.g. a numerical code, every thirty seconds. The code may be calculated by a formula that includes the present time and the authenticator's unique serial number. The code may be only good for a limited time, e.g. forty five seconds, and may only be good for a limited number of uses, e.g. one use. The code is also pertinent to a user's account.

The user must first register the authenticator with the user account. Registration may include providing the authenticator's unique serial number as well as additional information, e.g. the account and the authenticator may need to be time synched. After registration, the account, e.g. web site, and the authenticator will calculate the same code at the same time. Therefore, when the user enters the code from the user's authenticator, the user's code matches the code calculated by the account, and the user is allowed access to the account.

The authentication system 300 of embodiments of the present invention automatically generates a code with an authenticator 302, without the need for the user to visually copy the code from the authenticator 302. In an embodiment, an authentication security program 304 runs on the authenticator 302. A user 306 may be using a web browser 308 on a computer 310. The user 306 may use the web browser 308 to navigate to a web site 312 that requests an authentication code.

In an embodiment, the user 306 may request the authentication code from the authenticator 302. For example, the user 306 may press a button on the authenticator 302, or the user 306 may verbally request the authentication code from the authenticator 302. In response to the authentication code request from the user 306, the authenticator 302 may tactilely communicate the authentication code to the user 306. For example, the authenticator 302 may communicate the authentication code to the user 306 using a sequence of discrete vibrations, e.g. a pattern, that may be felt by the user's hand, for instance.

In some embodiments, the authenticator 302 may receive the authentication code request from the web site 312. For example, the user 306 may initiate the authentication code request by navigating to the web site 312. The web site 312 may then transmit the authentication code request to the authenticator 302. The authenticator 302 may then interpret the authentication code request as the user 302 requesting the authentication code and tactilely communicate the code to the user 306.

It will be appreciated that the exemplary embodiment of the authentication system 300 is only an example of many uses for the authenticator 302 in accordance with embodiments of the present invention. Embodiments of the present invention can be used in any case where authentication needs to be done without the need to visually read the authentication code from the authenticator 302. For example in addition to increasing user security, embodiments of the present invention can also be used for visually impaired users, thus supporting 508 compliance.

Figure 4:
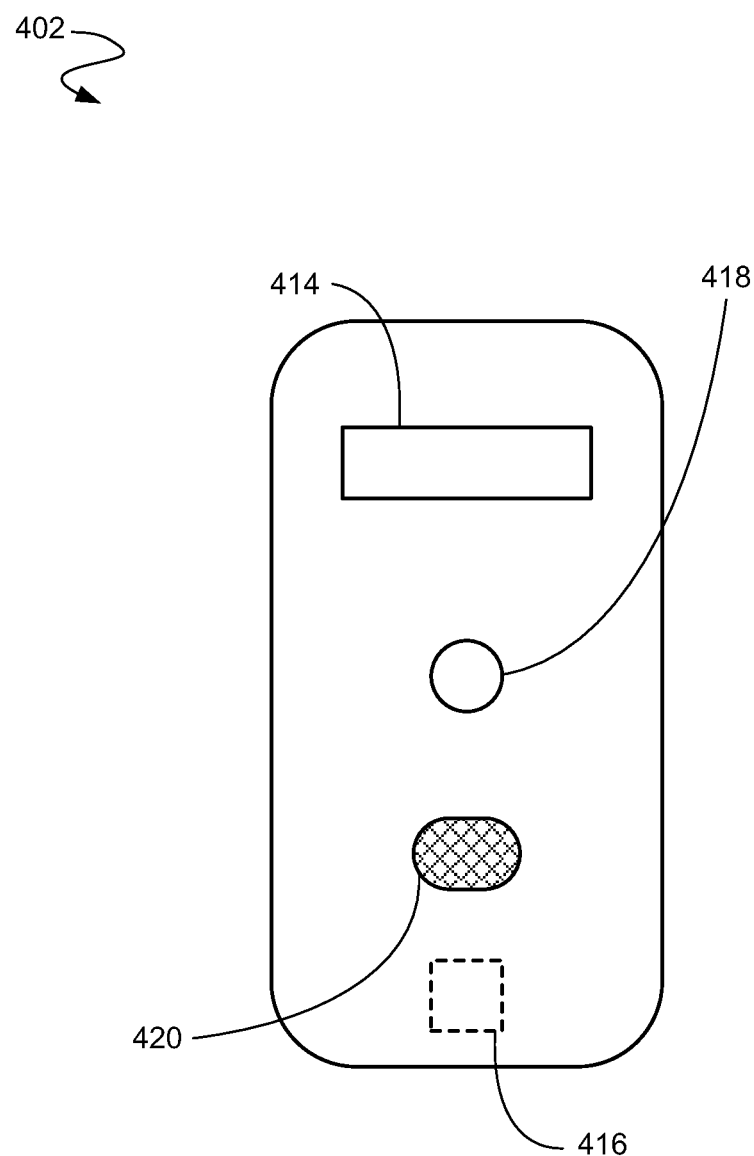
FIG. 4 depicts an exemplary authentication device of the authentication system, according to an embodiment of the present invention.

FIG. 4 depicts an exemplary authentication device 402 of the authentication system 300 (FIG. 3), according to an embodiment of the present invention. The authentication device 402 may be any device capable of calculating and/or tactilely communicating the authentication code. The authentication device 402 may include a display 414, a tactile rendering component 416 (e.g. a vibrator), an authentication request component 418 (e.g. a button), and a speaker 420.

In an embodiment, the authentication security program 304 (FIG. 3) may be a VIP application. The VIP application is an application that is installed on a user's authentication device 402. In an embodiment, it generates a six digit security code every 30 seconds. However in alternate embodiments any number of digits may be used with any combination of letters, numbers and symbols. The VIP application may be used for second factor authentication as an extra layer of security in addition to the user's username and password. In some embodiments, the VIP application may be preinstalled by OEM manufacturers or the end user may install it themselves.

Thus, for example, a user may request an authentication security code from the authentication device 402 by using the authentication request component 418 (e.g. the user presses a button). In response, the authentication device 402 tactilely communicates the authentication security code to the user with the tactile rendering component 416. For example, the tactile rendering component 416 may produce a vibration sequence of discrete vibrations for each letter, number, and/or symbol of the authentication security code. In some embodiments, each vibration sequence is separated by a pause, e.g. a 3-5 second pause. The user may then enter each letter, number, and/or symbol as it is produced by the tactile rendering component 416. The length of each vibration may also be used to convey different symbols, numbers, etc.

In some embodiments, the display 414 may also display the authentication security code. However, in other embodiments the authentication device 402 may not include the display 414, thus the authentication device 402 does not contemporaneously visually display the authentication security code. In further embodiments, the speaker 420 may audibly produce the authentication security code, e.g. using voice or beeps. However, in other embodiments the authentication device 402 may not include the speaker 420.

Figure 5:
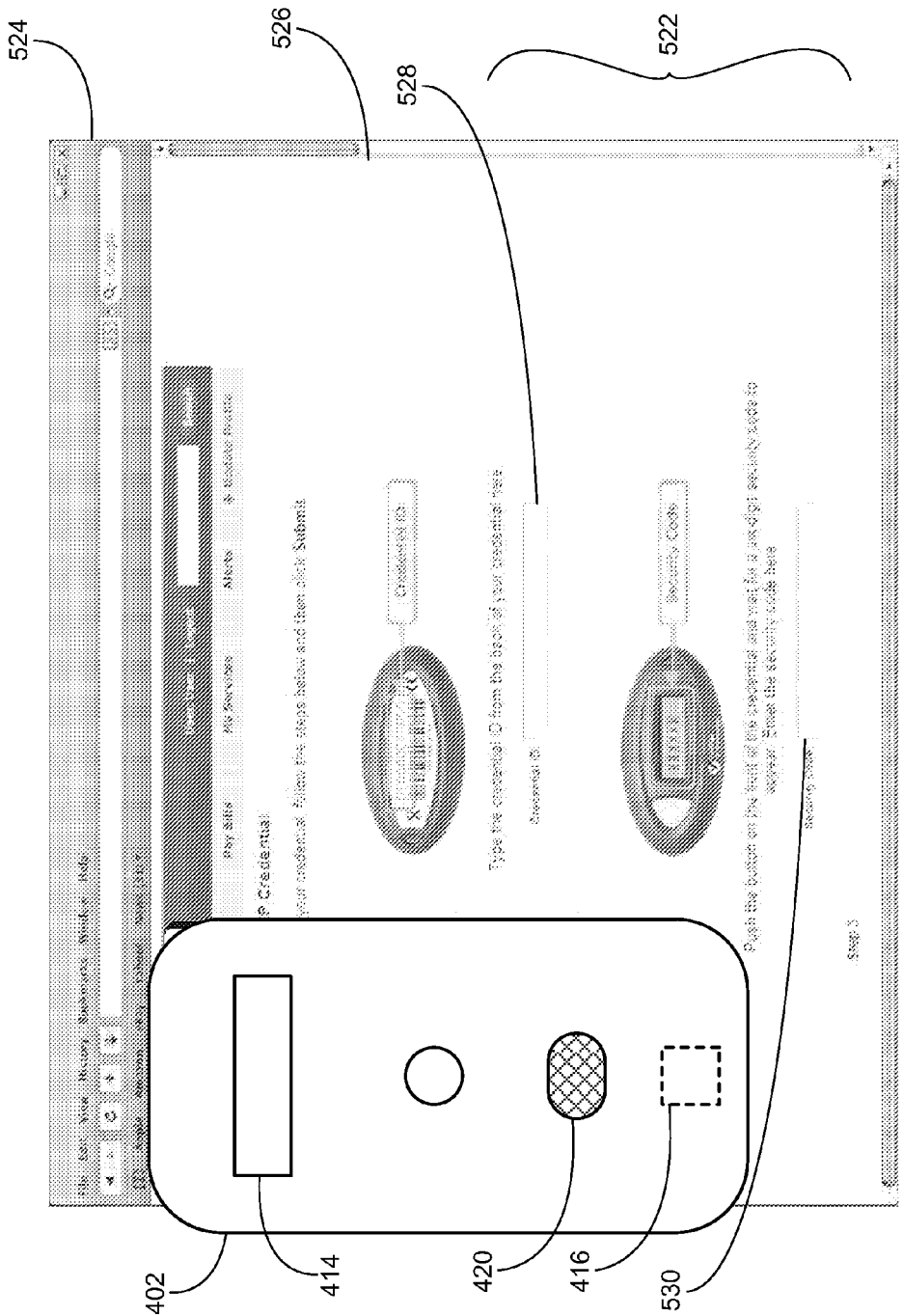
FIG. 5 depicts exemplary registration of the authentication device in a browser, according to an embodiment of the present invention.

FIG. 5 depicts exemplary registration 522 of the authentication device 402 in a browser 524, according to an embodiment of the present invention. For clarity of illustration, the authentication device 402 is illustrated as superimposed over the browser 524, and the relative sizes of the authentication device 402 and the browser 524 are not to scale. In an embodiment, the authentication device 402 may need to be registered with a user's account. The browser 524 may display a registration page 526 with a credential ID field 528 and a security code field 530. In addition, the authentication device 402 may provide a security code and/or a credential ID to the user with the display 414, the tactile rendering component 416, and/or the speaker 420.

In an embodiment, the registration page 526 and/or the authentication device 402 may instruct the user to enter the credential ID into the credential ID field 528. In addition, the registration page 526 and/or the authentication device 402 may instruct the user to manually enter the security code into the security code field 530. After the credential ID and the security code have been copied into their respective fields, registration is complete, and the user may be prompted to set up a backup VIP credential (see FIG. 6).

Figure 6:
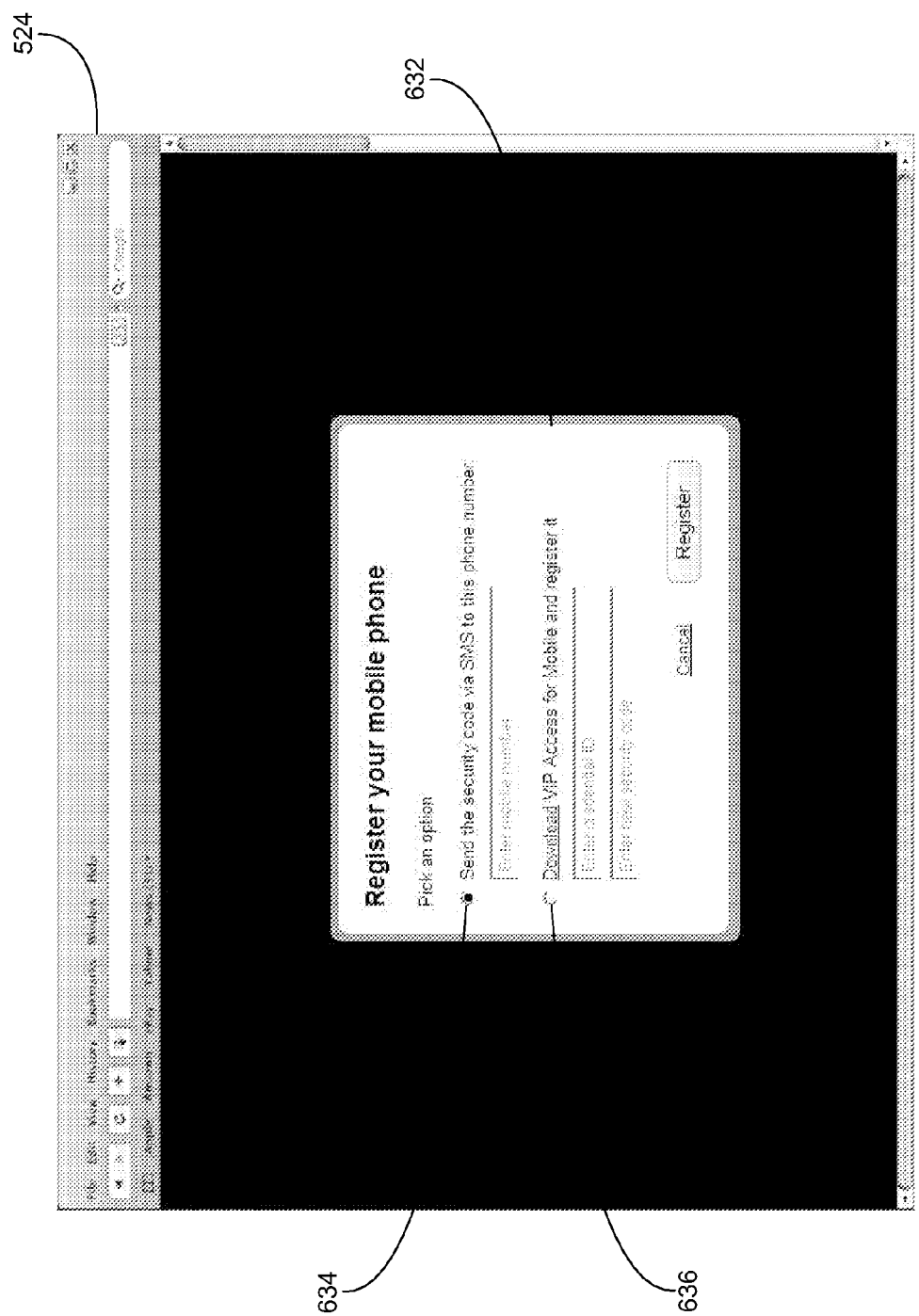
FIG. 6 depicts an exemplary backup credential registration of the authentication device in the browser, according to an embodiment of the present invention.

FIG. 6 depicts an exemplary backup credential registration 632 of the authentication device 402 in the browser 524, according to an embodiment of the present invention. Once the exemplary registration 522 (FIG. 5) is complete, the user may be prompted to set up the backup credential registration 632, for example using SMS or a mobile VIP application, in case the user accesses their account without access to the authentication device 402.

For example, the user may be prompted to select a SMS option 634 or a mobile VIP option 636. If the user selects the SMS option 634, the user may be asked to register a mobile phone number for SMS authentication. On the other hand, if the user selects the VIP option 636, the user may be asked to download and register a mobile VIP application for a mobile phone. Registration may include entering the credential ID for the mobile VIP application and a security code generated by the mobile VIP application.

Figure 7:
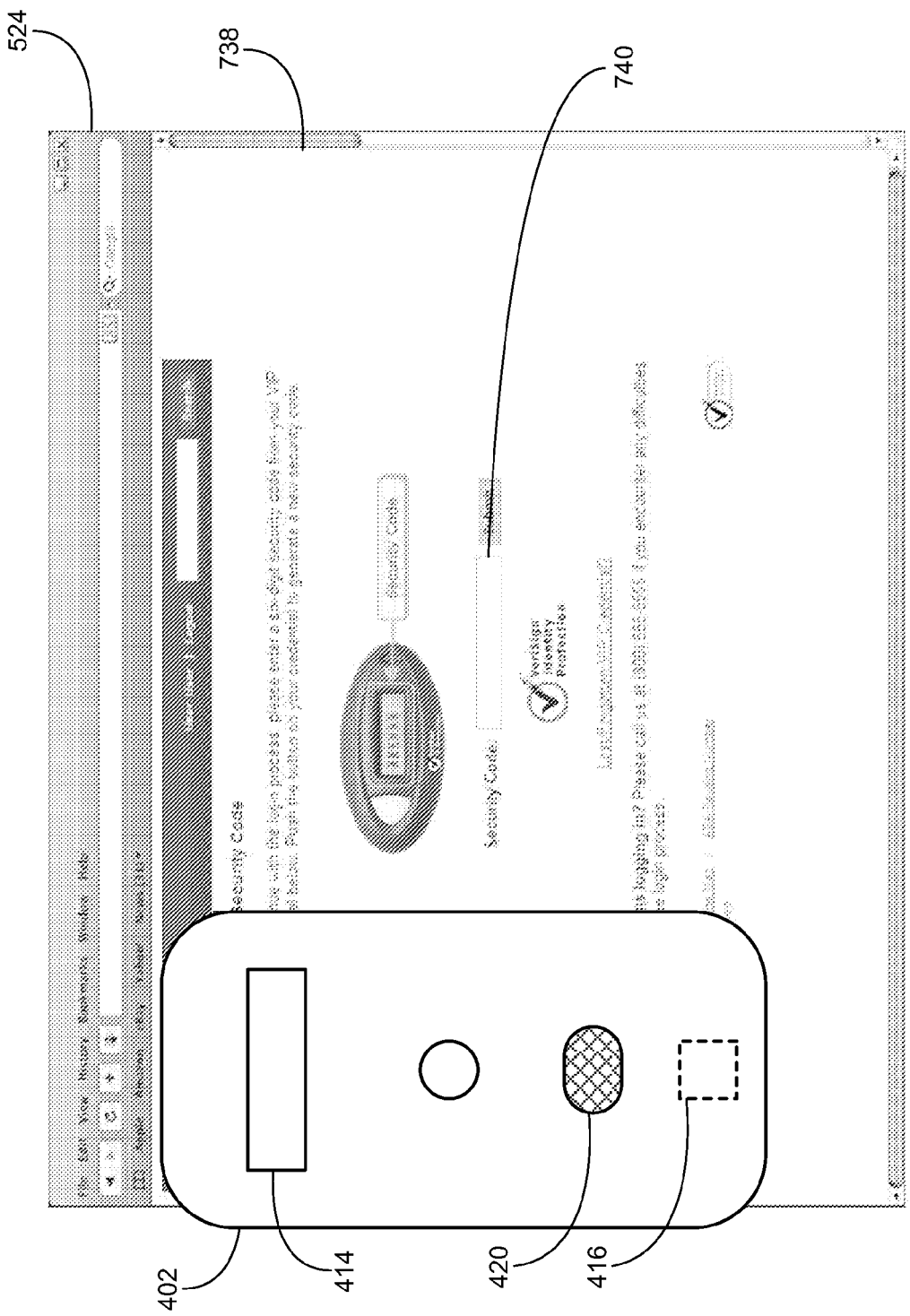
FIG. 7 depicts an exemplary security code entry page in the browser, according to an embodiment of the present invention.

FIG. 7 depicts an exemplary security code entry page 738 in the browser 524, according to an embodiment of the present invention. In some embodiments, the browser 638 may display the security code entry page 638 when the user attempts to navigate to a particular web page (e.g. log into a user's online account). The security code entry page 738 instructs the user to enter the security code into the appropriate field, for example the security code field 740. The user may then retrieve the security code from the authentication device 402 as described above, and enter the security code into the security code field 740.

Figure 8:
FIG. 8 depicts exemplary VIP application updates, according to an embodiment of the present invention.
Figure 8:
Figure 8:
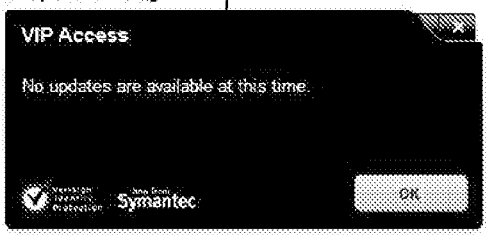
Figure 8:
Figure 8:
Figure 8:
Figure 8:
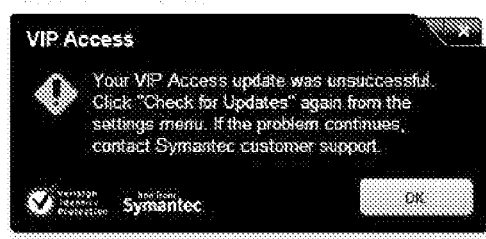

FIG. 8 depicts exemplary VIP application updates (e.g. on a mobile phone), according to an embodiment of the present invention. In an embodiment, the user may be prompted to initiate an automatic update, for example by selecting an "Update Now" button. In some embodiments, the automatic update may proceed automatically, without the need for user initiation. Thereafter, updates to the VIP application will be automatically downloaded and installed.

For example, the authentication device 402 (FIG. 4) will check for updates and display a checking for updates window 842. If a new update is available, the user may be asked if they wish to download and install the update in an available update window 844. However, if no update is available, the user will be informed that no updates were available in a no update available window 846.

In an embodiment, after the user has allowed the automatic update to proceed, a progress window 848 may be displayed. The progress window allows the user to see that the update is proceeding, and may provide additional information, for example time remaining and download details, in some embodiments.

In some embodiments, there may be separate download and install windows. For example, the user may only be prompted to download the update in the available update window 844. After the update has been downloaded, the user may be prompted again to allow the installation of the update in an installation window 850. In some embodiments, the progress window 848 may be displayed for the update download and/or the update installation.

In various embodiments, the user may be informed of the success or failure of the update. For example, if the update is successful, a successful update window 852 may be displayed. However, if the update is unsuccessful, an unsuccessful window 854 may be displayed.

Figure 9:
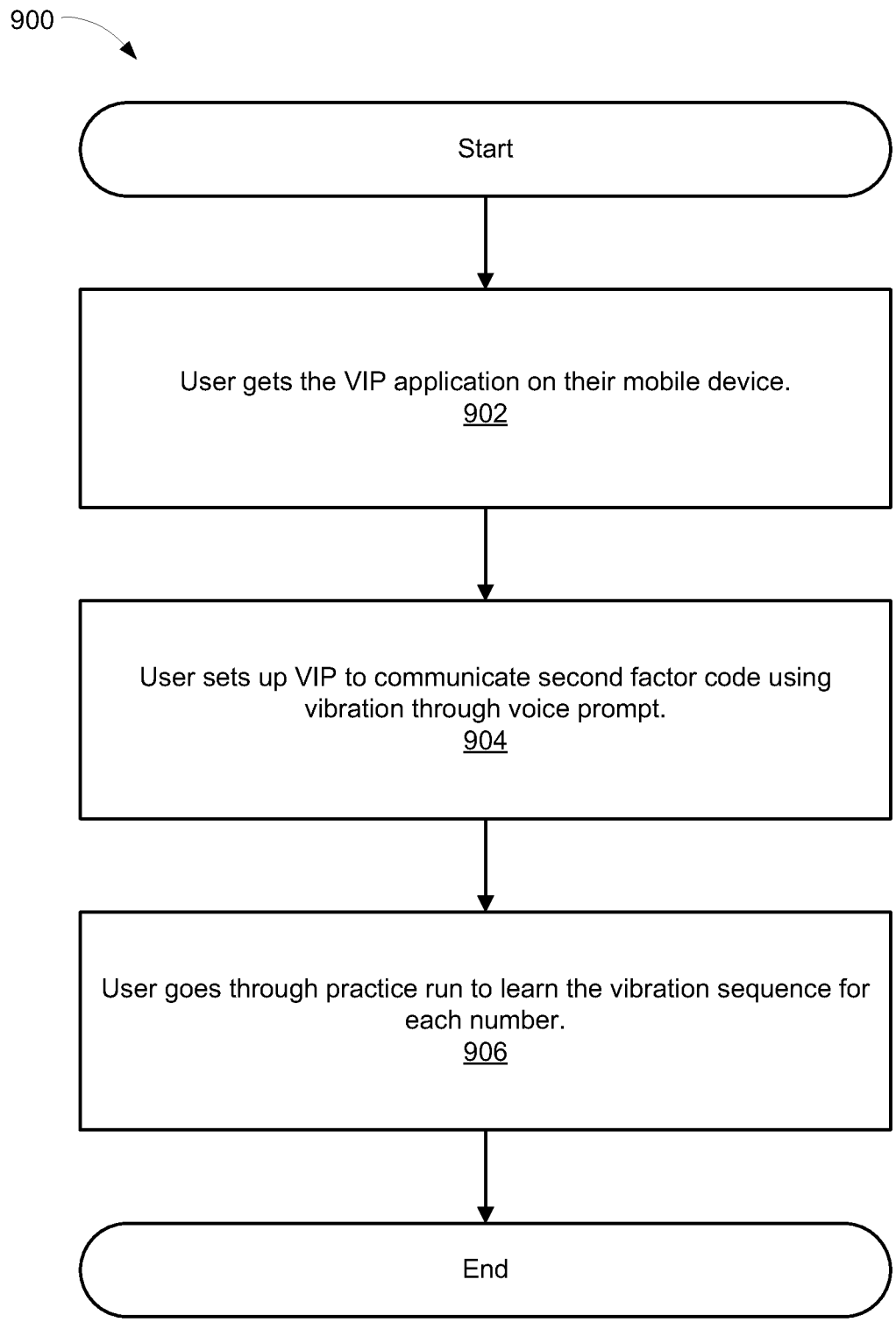
FIG. 9 depicts a flowchart of an exemplary method of vibration training, according to an embodiment of the present invention.

FIG. 9 depicts a flowchart 900 of an exemplary method of vibration training, according to an embodiment of the present invention. Although specific steps are disclosed in the flowchart 900, such steps are exemplary. That is, embodiments of the present invention are well-suited to performing various other steps or variations of the steps recited in the flowchart 900. The flowchart 900 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In a step 902, a user gets the VIP application on their mobile device. For example, a user may download the VIP application onto a mobile device (e.g. a mobile phone, smart phone, physical dongle device, etc.) from an online application store. The user may also install the VIP application onto the mobile device from a computer (e.g. through a USB cable).

In a step 904, the user sets up VIP to communicate a second factor code using vibration through a voice prompt. In some embodiments, a visually impaired user may use voice prompts to set up the VIP application. For example, the user may listen to and respond to voice prompts from the mobile device for the installation and configuration of the VIP application. In various embodiments, the mobile device may recognize verbal commands from the user.

In a step 906, the user may go through one or more practice runs to learn the vibration sequence for each number, letter, or symbol used by the VIP application. For example, the mobile device may use voice prompts in conjunction with vibration sequences to teach the user vibration sequences representing letters, numbers, and/or symbols. Thus, in an embodiment the mobile device may use a voice prompt to communicate a letter, number, or symbol to the user. The voice prompt may then be followed by a vibration sequence corresponding to the voice prompt letter, number, or symbol. In some embodiments, the vibration sequence may be followed by a pause and then repeated. In further embodiments, a new voice prompt and vibration sequence may then be communicated to the user for learning.

Figure 10:
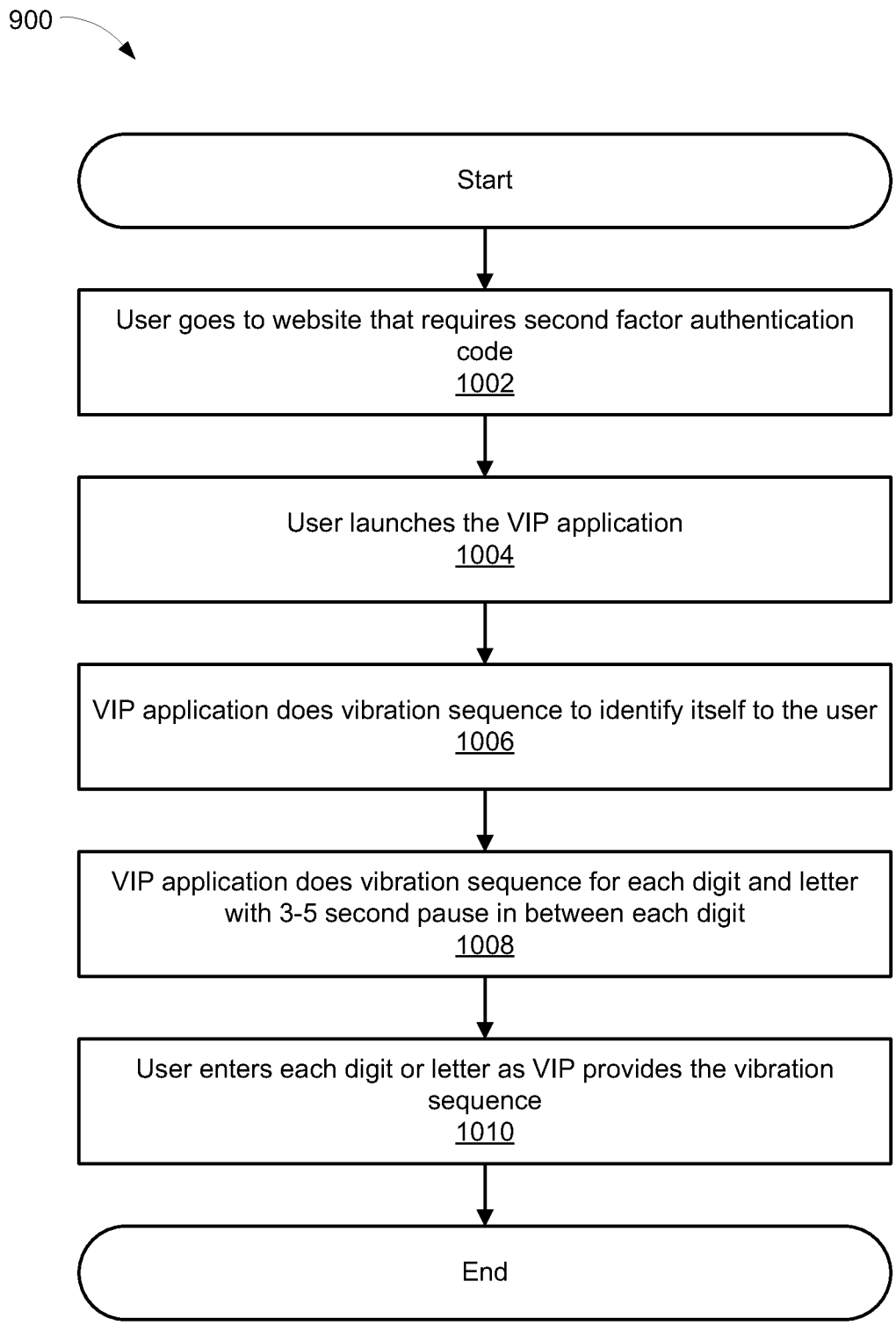
FIG. 10 depicts a flowchart of an exemplary method of vibration usage, according to an embodiment of the present invention.

FIG. 10 depicts a flowchart 1000 of an exemplary method of vibration usage, according to an embodiment of the present invention. Although specific steps are disclosed in the flowchart 1000, such steps are exemplary. That is, embodiments of the present invention are well-suited to performing various other steps or variations of the steps recited in the flowchart 1000. The flowchart 1000 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In a step 1002, a user goes to a website that requires a second factor authentication code. For example, in FIG. 7 the user navigates to a security code entry page that requests an authentication security code.

In a step 1004, the user launches the VIP application. For example, the user may launch the VIP application on a mobile device, a smart phone, or a physical dongle device. In some embodiments, the VIP application may run continuously and may not need to be launched. After launching the VIP application the user may request an authentication security code.

In a step 1006, the VIP application does a vibration sequence to identify itself to the user. The vibration pattern may be felt by the user's hand, for instance. In some embodiments, the user may program a unique vibration sequence for the mobile device. The unique vibration sequence communicates to the user that the desired VIP application is available.

In a step 1008, the VIP application does a vibration sequence for each digit, letter, and/or symbol of the security code with a 3-5 second pause in between each digit, letter, and/or symbol. After calculating the authentication security code, the VIP application tactilely communicates the authentication security code to the user with a series of separate vibration sequences. The vibration sequences may represent one or more of the digits, letters, and/or symbols comprising the authentication security code. In some embodiments, the vibration sequences may be separated by a pause, e.g. a 3-5 second pause.

In a step 1010, the user enters each digit, letter, and/or symbol as the VIP application provides the corresponding vibration sequence. After interpreting one or more of the vibration sequences, the user may enter each digit, letter, and/or symbol into the security code entry page.

Figure 11:
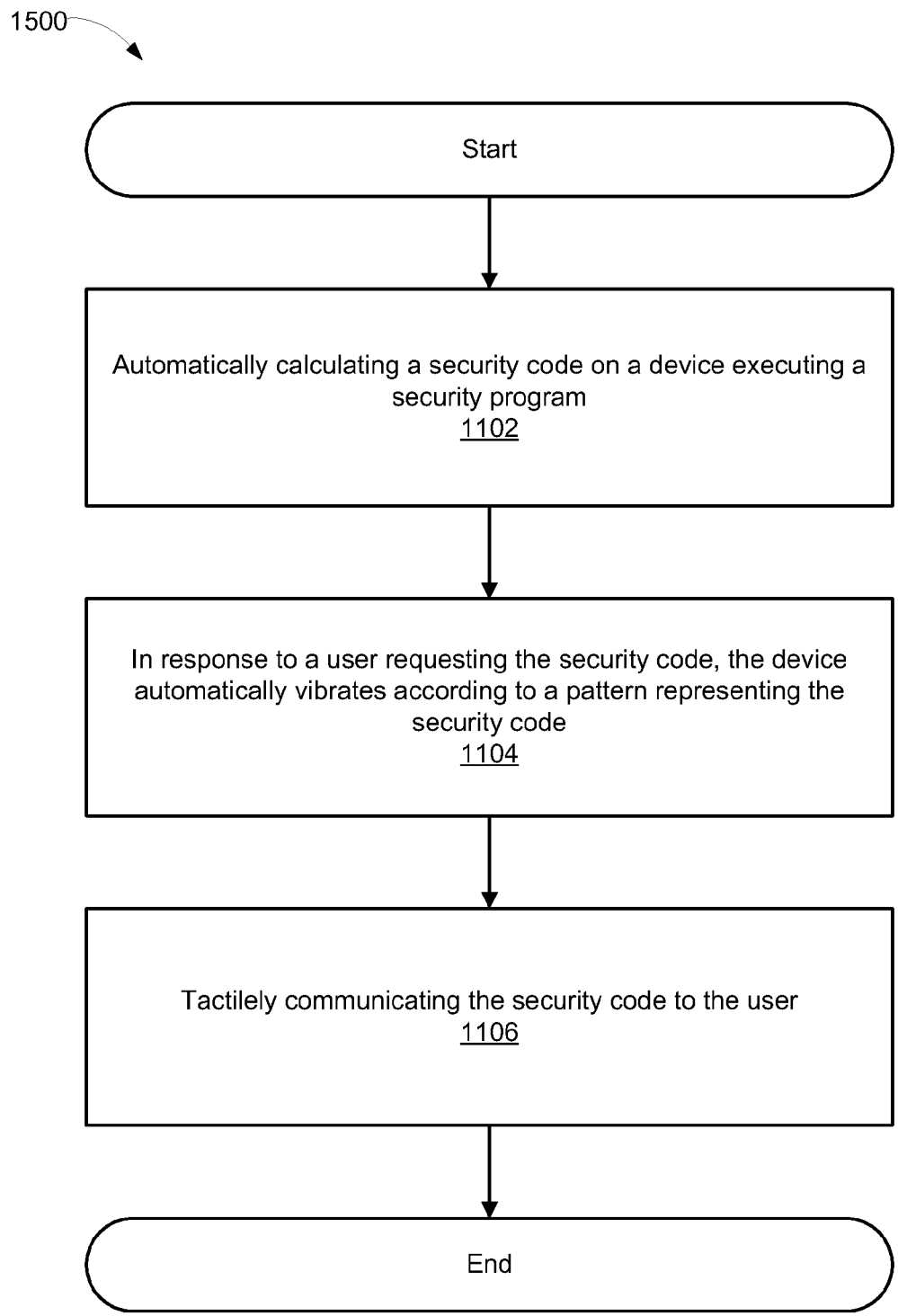
FIG. 11 depicts an exemplary computer controlled flow diagram of a method of transmitting an authentication code, according to an embodiment of the present invention.

FIG. 11 depicts a flowchart 1100 of an exemplary method of transmitting an authentication code, according to an embodiment of the present invention. Although specific steps are disclosed in the flowchart 1100, such steps are exemplary. That is, embodiments of the present invention are well-suited to performing various other steps or variations of the steps recited in the flowchart 1100. The flowchart 1100 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In a step 1102, a security code is automatically calculated on a device executing a security program. In some embodiments, the security program periodically calculates a respective unique security code. For example, in FIG. 3 an authenticator is a second factor credential device that periodically generates a unique code applicable for a user. For example, an authenticator may generate a new code, e.g. a numerical code, every thirty seconds. The code may be calculated by a formula that includes the present time and the authenticator's unique serial number. The code may be only good for a limited time, e.g. forty five seconds, and may only be good for a limited number of uses, e.g. one use.

In a step 1104, in response to a user requesting the security code, the device automatically vibrates according to a pattern representing the security code. For example, in FIG. 4 a user may request an authentication security code from the authentication device by using the authentication request component (e.g. the user presses a button). In response, the authentication device tactilely communicates the authentication security code to the user with the tactile rendering component.

In some embodiments, the device does not contemporaneously visually display the security code. For example, in FIG. 4 the display may also display the authentication security code. However, in other embodiments the authentication device may not include the display, thus the authentication device does not contemporaneously visually display the authentication security code. In various embodiments, the device may be a mobile device, a smart phone, or a dongle device. For example, in FIG. 3 the vibrating authentication code generating device may be a physical dongle device, a mobile device, or a mobile application running on a smart phone.

In further embodiments, the security code is a number, a letter, and/or a symbol. For example, in FIG. 4 the authentication security program may be a VIP application. The VIP application is an application that is installed on a user's authentication device. In an embodiment, it generates a six digit security code every 30 seconds. However in alternate embodiments any number of digits may be used with any combination of letters, numbers and symbols.

In a step 1106, the security code is tactilely communicated to the user. For example, in FIG. 4 the tactile rendering component may produce a vibration sequence for each letter, number, and/or symbol of the authentication security code. In some embodiments, the device may audibly render the pattern. For example, in FIG. 4 the authentication device may include a display, a tactile rendering component (e.g. a vibrator), an authentication request component (e.g. a button), and a speaker. The speaker may audibly produce the authentication security code, e.g. using voice or beeps.

In various embodiments, the method further includes, in response to the user initiating a security code request from a web site, the device receiving the security code request from the web site, wherein the device interprets the security code request as the user requesting the security code. For example, in FIG. 3 the authenticator may receive the authentication code request from the web site. For example, the user may initiate the authentication code request by navigating to the web site. The web site may then transmit the authentication code request to the authenticator. The authenticator may then interpret the authentication code request as the user requesting the authentication code and tactilely communicate the code to the user.

Figure 12:
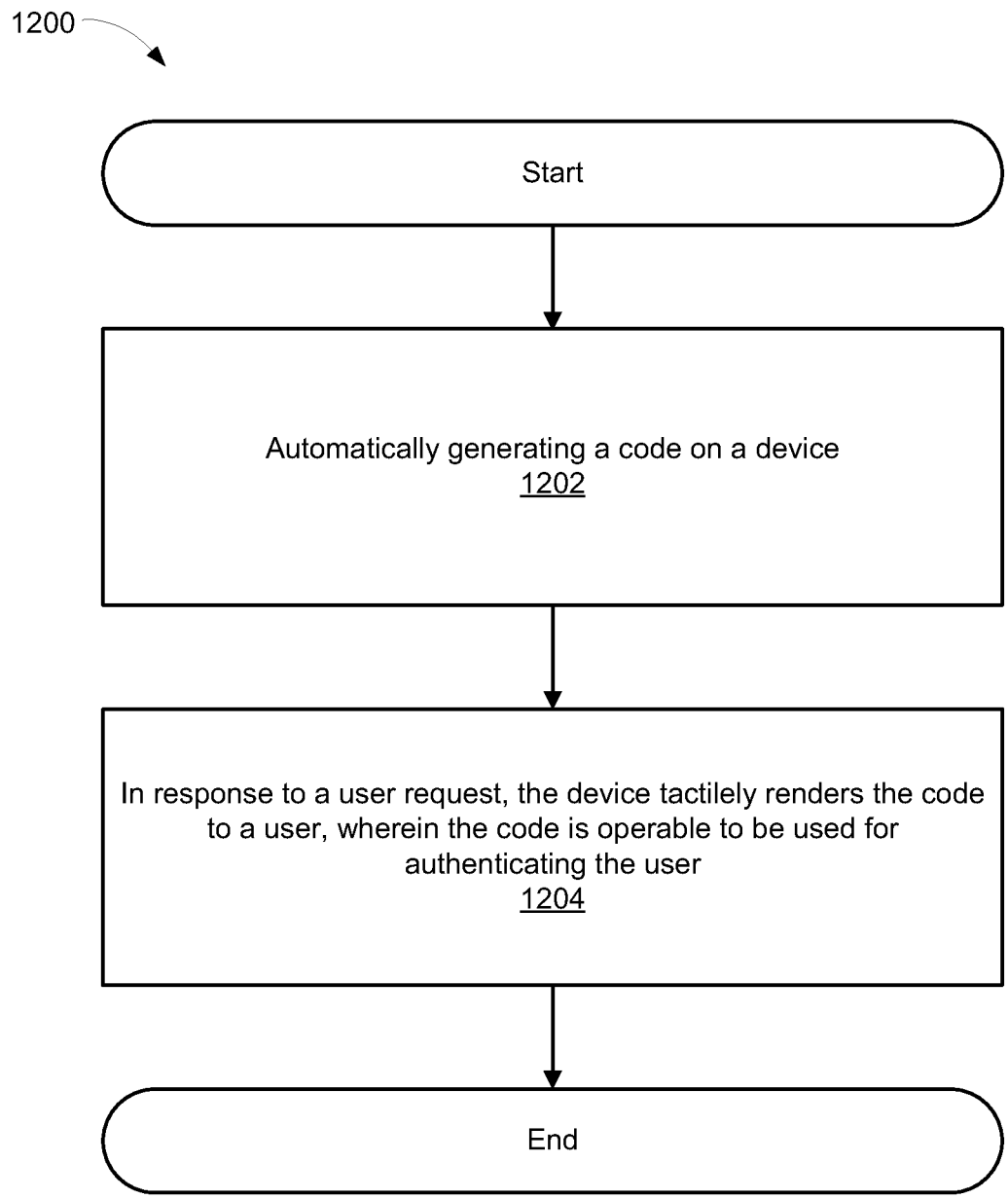
FIG. 12 depicts an exemplary computer controlled flow diagram of a method of authentication, according to an embodiment of the present invention.

FIG. 12 depicts a flowchart 1200 of an exemplary method of authentication, according to an embodiment of the present invention. Although specific steps are disclosed in the flowchart 1200, such steps are exemplary. That is, embodiments of the present invention are well-suited to performing various other steps or variations of the steps recited in the flowchart 1200. The flowchart 1200 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In a step 1202, a code is automatically generated on a device. In some embodiments, a security program periodically calculates a respective unique security code. For example, in FIG. 3 an authenticator is a second factor credential device that periodically generates a unique code applicable for a user. For example, an authenticator may generate a new code, e.g. a numerical code, every thirty seconds. The code may be calculated by a formula that includes the present time and the authenticator's unique serial number. The code may be only good for a limited time, e.g. forty five seconds, and may only be good for a limited number of uses, e.g. one use.

In a step 1204, in response to a user request, the device tactilely renders the code to a user, wherein the code is operable to be used for authenticating the user. For example, in FIG. 4 a user may request an authentication security code from the authentication device by using the authentication request component (e.g. the user presses a button). In response, the authentication device tactilely communicates the authentication security code to the user with the tactile rendering component.

In some embodiments, the device does not contemporaneously visually display the code. For example, in FIG. 4 the display may also display the authentication security code. However, in other embodiments the authentication device may not include the display, thus the authentication device does not contemporaneously visually display the authentication security code. In various embodiments, the device may be a mobile device, a smart phone, or a dongle device. For example, in FIG. 3 the vibrating authentication code generating device may be a physical dongle device, a mobile device, or a mobile application running on a smart phone.

In further embodiments, the security code is a number, a letter, and/or a symbol. For example, in FIG. 4 the authentication security program may be a VIP application. The VIP application is an application that is installed on a user's authentication device. In an embodiment, it generates a six digit security code every 30 seconds. However in alternate embodiments any number of digits may be used with any combination of letters, numbers and symbols.

In some embodiments, the device may audibly render the pattern. For example, in FIG. 4 the authentication device may include a display, a tactile rendering component (e.g. a vibrator), an authentication request component (e.g. a button), and a speaker. The speaker may audibly produce the authentication security code, e.g. using voice or beeps.

In various embodiments, the method further includes, in response to the user initiating a request from a web site, the device receiving the request from the web site, wherein the device understands the request as the user request. For example, in FIG. 3 the authenticator may receive the authentication code request from the web site. For example, the user may initiate the authentication code request by navigating to the web site. The web site may then transmit the authentication code request to the authenticator. The authenticator may then interpret the authentication code request as the user requesting the authentication code and tactilely communicate the code to the user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method comprising:
communicating a first digit to a user via a first voice prompt;
causing a device to vibrate according to a first vibration corresponding to the first digit;
communicating a second digit to the user via a second voice prompt;
causing the device to vibrate according to a second vibration corresponding to the second digit; and
in response to a user requesting a security code, causing the device to automatically vibrate according to a vibration pattern representing the security code,
wherein the vibration pattern tacitly communicates the security code to the user,
wherein the security code comprises the first digit and the second digit, wherein the first digit is different than the second digit,
wherein the vibration pattern comprises the first vibration corresponding to the first digit, the second vibration corresponding to the second digit, and a pause between the first vibration and the second vibration, and
wherein a length of the first vibration is different than a length of the second vibration.

2. The method of claim 1 wherein the device periodically calculates a respective unique security code.

3. The method of claim 1 wherein the device does not contemporaneously visually display the security code.

4. The method of claim 1 wherein the first digit is at least one of a letter or a symbol.

5. The method of claim 1 further comprising:
in response to the user initiating a security code request from a web site, the device receiving the security code request from the web site, wherein the device interprets the security code request as the user requesting the security code.

6. The method of claim 1 further comprising audibly rendering the vibration pattern.

7. The method of claim 1 wherein the device is at least one of a mobile device, a smart phone, or a dongle device.

8. A method of authentication, the method comprising:
communicating a first digit to a user via a first voice prompt;
causing a device to vibrate according to a first vibration corresponding to the first digit;
communicating a second digit to the user via a second voice prompt;
causing the device to vibrate according to a second vibration corresponding to the second digit;
automatically generating a code on the device, wherein the code comprises a plurality of digits, the plurality of digits comprising the first digit and the second digit; and
in response to a user request, the device tactilely rendering the code to a user,
wherein the code is operable to be used for authenticating the user to a remote system that maintains a user account, wherein the device tactilely renders the code to the user by producing the first vibration corresponding to the first digit and the second vibration corresponding to the second digit, wherein a length of the first vibration is different than a length of the second vibration.

9. The method of claim 8 wherein the device periodically computes a respective unique code.

10. The method of claim 8 wherein the device does not contemporaneously visually display the code.

11. The method of claim 8 wherein each of the plurality of digits is a number, a character, or a symbol.

12. The method of claim 8 further comprising
in response to the user initiating a request from a web site, receiving the request from the web site at the device, wherein the device understands the request as the user request.

13. The method of claim 8 further comprising audibly rendering the code.

14. The method of claim 8 wherein the device is at least one of a mobile device, a smart phone, or a dongle device.

15. A system comprising:
a processor;
a tactile rendering component;
a memory coupled to the processor, wherein the memory comprises instructions that when executed cause the system to perform operations comprising:
communicating a first digit to a user via a first voice prompt;
causing the tactile rendering component to vibrate according to a first vibration corresponding to the first digit;
communicating a second digit to the user via a second voice prompt;
causing the tactile rendering component to vibrate according to a second vibration corresponding to the second digit; and
in response to a user requesting a security code, causing the tactile rendering component to automatically vibrate in accordance with a vibration pattern representing the security code,
wherein the vibration pattern tactilely communicates the security code to the user,
wherein the security code comprises the first digit and the second digit, wherein the first digit is different than the second digit,
wherein the vibration pattern comprises the first vibration corresponding to the first digit, the second vibration corresponding to the second digit, and a pause between the first vibration and the second vibration, and
wherein a length of the first vibration is different than a length of the second vibration.

16. The system of claim 15 wherein the processor periodically calculates respective unique security codes.

17. The system of claim 15 wherein the operations further comprises not visually displaying the security code.

18. The system of claim 15 wherein the first digit is at least one of a letter or a symbol.

19. The system of claim 15 wherein the operations further comprise:
in response to the user initiating a security code request from a web site, receiving the security code request from the web site, and interpreting the security code request as the user requesting the security code.

20. The system of claim 15 wherein the operations further comprise audibly rendering the security code.

21. A non-transitory computer-readable storage medium having instructions that, when executed by a processor, cause the processor to perform operations comprising:
communicating a first digit to a user via a first voice prompt;
causing a device to vibrate according to a first vibration corresponding to the first digit;
communicating a second digit to the user via a second voice prompt;
causing the device to vibrate according to a second vibration corresponding to the second digit; and
automatically generating a code in response to a request from the user, wherein the code comprises a plurality of digits, the plurality of digits comprising the first digit and the second digit, wherein the code is to be tactilely transmitted to the user by producing the first vibration corresponding to the first digit and the second vibration corresponding to the second digit, wherein a length of the first vibration is different than the length of the second vibration.

* * * * *